(12) United States Patent
Bhakar et al.

(10) Patent No.: US 10,007,554 B2
(45) Date of Patent: Jun. 26, 2018

(54) TASK SCHEDULING BASED ON USER INTERACTION

(71) Applicant: Microsoft Corporation, Redmond, WA (US)

(72) Inventors: Gautam Bhakar, Redmond, WA (US); Selvaraj Nalliah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 898 days.

(21) Appl. No.: 13/918,555

(22) Filed: Jun. 14, 2013

(65) Prior Publication Data

US 2014/0282567 A1    Sep. 18, 2014

Related U.S. Application Data

(60) Provisional application No. 61/779,103, filed on Mar. 13, 2013.

(51) Int. Cl.
*G06F 9/46* (2006.01)
*G06F 9/48* (2006.01)

(52) U.S. Cl.
CPC ...... *G06F 9/4881* (2013.01); *G06F 2209/485* (2013.01)

(58) Field of Classification Search
None
See application file for complete search history.

(56) References Cited

U.S. PATENT DOCUMENTS

| | | | |
|---|---|---|---|
| 2004/0143741 A1* | 7/2004 | Edwards | G06F 21/6218 713/176 |
| 2004/0177243 A1* | 9/2004 | Worley, Jr. | G06F 9/468 713/2 |
| 2008/0163224 A1* | 7/2008 | Frank et al. | 718/102 |
| 2010/0138834 A1* | 6/2010 | Agarwal et al. | 718/100 |
| 2011/0264787 A1* | 10/2011 | Mickens et al. | 709/224 |

* cited by examiner

*Primary Examiner* — Tammy E Lee (57) ABSTRACT

Provided herein are systems, methods, and software for implementing information management applications. In an implementation, at least a portion of an information management application is embodied in program instructions that include various task modules and a scheduler module. In some implementations the program instructions are written in accordance with a single threaded programming language, such as JavaScript or any other suitable single threaded language. When executed, each task module returns control to the scheduler module upon completing. The scheduler module identifies to which of the plurality of task modules to grant control based at least in part on a relevance of each task module to a user interaction.

20 Claims, 8 Drawing Sheets

TASK SCHEDULING BASED ON USER INTERACTION

RELATED APPLICATIONS

This application claims the benefit of and priority to U.S. Provisional Patent Application No. 61/779,103, filed on Mar. 13, 2013, and entitled "TASK SCHEDULING BASED ON USER INTERACTION," which is hereby incorporated by reference in its entirety.

TECHNICAL FIELD

Aspects of the disclosure are related to computing hardware and software technology, and in particular to information management applications.

TECHNICAL BACKGROUND

Information management applications provide users with effective and convenient ways to communicate with others and manage their information. Examples of information management applications include but are not limited to email applications and calendar applications. Some information management applications integrate these various types of applications by way of modules, such as email, calendar, contact, and task modules, although each type of application or functionality may also be provided in a stand-alone manner. Microsoft® Outlook® is one example of an information management application.

While many information management applications are provided as locally installed and executed applications, many can be experienced in a wide variety of ways. For example, some information management applications are available as web-based applications that are experienced through a browser application, as mobile applications customized for mobile environments, or even as a mobile web-based application generally developed for a mobile browser experience. In addition, information management applications can be experienced on a wide variety of computing devices, such as desktop, laptop, or tablet computers, mobile phones, gaming systems, Internet appliances, or any other physical or virtual computing system, variation, or combination thereof.

Many information management applications are implemented, at least in part, using single threaded programming languages such as JavaScript. In execution, only one task or module may execute at a time. This means that a task triggered by a user interaction, such as a task associated with opening a folder or an email, may not run until other scheduled tasks are finished executing.

From the standpoint of a user, this type of execution can lead to slow and frustrating user experiences. For instance, when navigating to a folder containing a large number of emails, a user may select an email that is already available for viewing. However, the user may be prevented from viewing the email until all of the other emails have loaded. Not only is this experience frustrating, but at times error conditions can occur that create failures and other operational problems.

OVERVIEW

Provided herein are systems, methods, and software for implementing information management applications and information exchange services. In an implementation, at least a portion of an information management application is embodied in program instructions that include various task modules and a scheduler module. In some implementations the program instructions are written in accordance with a single threaded programming language, such as JavaScript or any other suitable single threaded language. When executed, each task module returns control to the scheduler module upon completing. The scheduler module identifies to which of the plurality of task modules to grant control based at least in part on a relevance of each task module to a user interaction.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Implementations disclosed herein enable improved processing. In an implementation, at least a portion of an information management application is embodied in program instructions that include various task modules and a scheduler module. In some implementations the program instructions are written in accordance with a single threaded programming language, such as JavaScript or any other suitable single threaded language. When executed, each task module returns control to the scheduler module upon completing. The scheduler module identifies to which of the plurality of task modules to grant control based at least in part on a relevance of each task module to a user interaction.

For example, some of the task modules may together be considered an operation series. In a situation without any intervening user interaction, the scheduler may select each task module in accordance with its order in the operation series so as to accomplish the operation represented by the series.

However, a user interaction may occur. The scheduler module may be made aware of the user interaction and may consider the interaction when selecting the next task module for execution. Control may be given to a different task module that is not part of the operation series. In other words, the operation series may, in a sense, be interrupted in favor of the different task module. The scheduler may consider a variety of factors when selecting the next task module, such as to what element the user interaction pertained. This may enable various benefits such as faster or more responsive user interface operations.

In an example, a user may navigate to a folder within an email module of an information management application. The folder may include a large number of emails that take a relatively long time to load in their entirety. In the meantime, the user may select one of the emails that loaded successfully. In this scenario, the selection of the email may interrupt the loading of the remainder of the emails such that the selected email can be presented to the user without delay.

In some implementations, a subset of the task modules may be considered an operation series that is interrupted by the user interaction, in response to which control may be granted to a task module not included in the operation series. Upon that task module completing, control can revert back to the scheduler.

In at least one implementation, the operation series may execute on a single thread upon launching the information management application. Executing the operation series may render an initial view of a user interface to the application, including various elements in the user interface. The relevance of each of the task modules may comprise to which element of the various elements in the user interface the user interaction pertained. In at least one scenario, the element is an email.

Figure 1:
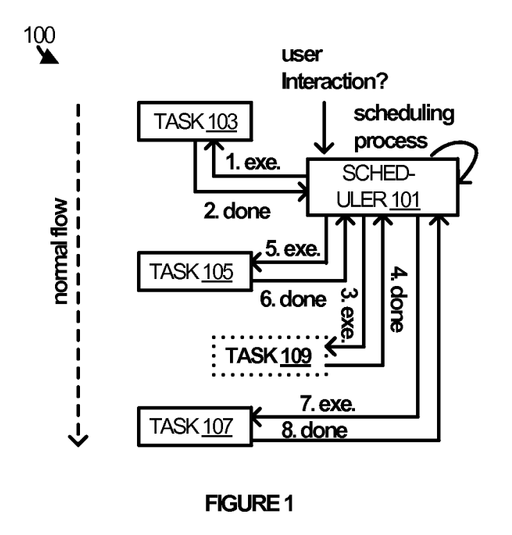
FIG. 1 illustrates an operational scenario in an implementation.

FIG. 1 illustrates an operational scenario 100 involving various tasks and a scheduler to demonstrate some aspects in an implementation. Operational scenario 100 involves scheduler 101, task 103, task 105, task 107, and task 109.

Under normal conditions in which no user interaction occurs or qualifies to interrupt, scheduler 101 may schedule a normal flow of tasks for execution in the following order: task 103, task 105, and task 107. However, at the completion of each task, control returns back to scheduler 101 which implements a scheduling process to identify the next task for execution. Among other possible factors, scheduler 101 considers whether or not any user interaction occurred that might warrant prioritization of one task or another over the normally scheduled order of tasks.

In this scenario, a sample execution flow is provided that departs from the normal flow. First, task 103 executes and returns control to scheduler 101. Scheduler 101 employs a scheduling process and determines that task 109 should be prioritized over ask 105. Accordingly, task 109 executes and upon completion returns control back to scheduler 101. Scheduler 101 employs the scheduling process again and selects task 105 for completion. Finally, scheduler 101 selects task 107 for completion.

Figure 2:
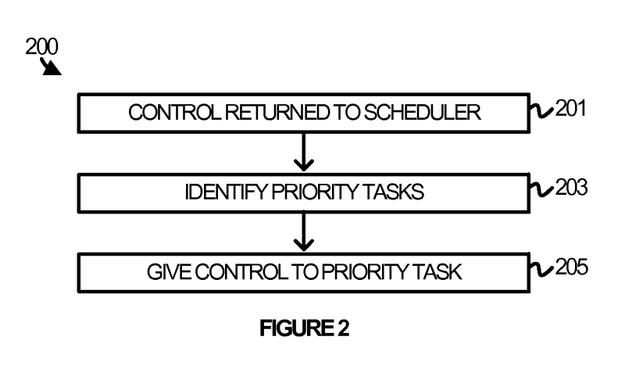
FIG. 2 illustrates a scheduling process in an implementation.

FIG. 2 illustrates a representative scheduling process 200 that may be employed by scheduler 101 or any other scheduling module. In operation, control returns to the scheduler (step 201), such as at the completion of another task. The scheduler identifies or otherwise determines whether or not any other tasks should be prioritized over other tasks that may already be scheduled or programmed in a particular order (step 203). This determination is based on any user interaction that may have occurred, as well as other possible factors, such as how many tasks may remain in an operation series and the like.

Assuming that a task is identified for priority execution, control is given to that task (step 205). That task can execute and then return control back to the scheduler.

Figure 3:
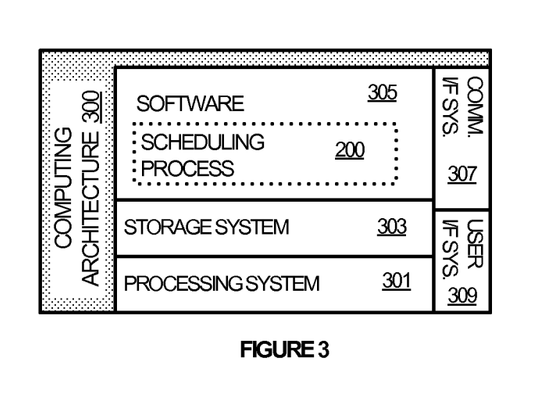
FIG. 3 illustrates a computing architecture in an implementation.

Referring now to FIG. 3, computing architecture 300 is representative of an architecture that may be employed in any apparatus, system, or device, or collections thereof, to suitably implement all or portions of scheduling process 200 illustrated in FIG. 2 or variations thereof, and optionally all or portions of the information management application referred to with respect to FIG. 1. Scheduling process 200 may be implemented on a single apparatus, system, or device or may be implemented in a distributed manner. The information management application may also be implemented on a single apparatus, system, or device or may be implemented in a distributed manner. Scheduling process 200 may be integrated with the information management application, but may also stand alone or be embodied in some other application.

Computing architecture 300 may be employed in, for example, desktop computers, laptop computers, tablet computers, notebook computers, mobile computing devices, cell phones, media devices, and gaming devices, as well as any other type of physical or virtual computing machine and any combination or variation thereof. Computing architecture 300 may also be employed in, for example, server computers, cloud computing platforms, data centers, any physical or virtual computing machine, and any variation or combination thereof.

Computing architecture 300 includes processing system 301, storage system 303, software 305, communication interface system 307, and user interface system 309. Processing system 301 is operatively coupled with storage system 303, communication interface system 307, and user interface system 309. Processing system 301 loads and executes software 305 from storage system 303. When executed by processing system 301, software 305 directs processing system 301 to operate as described herein for scheduling process 200 or its variations. Computing architecture 300 may optionally include additional devices, features, or functionality not discussed here for purposes of brevity.

Referring still to FIG. 3, processing system 301 may comprise a microprocessor and other circuitry that retrieves and executes software 305 from storage system 303. Processing system 301 may be implemented within a single processing device but may also be distributed across multiple processing devices or sub-systems that cooperate in executing program instructions. Examples of processing system 301 include general purpose central processing units, application specific processors, and logic devices, as well as any other type of processing device, combinations, or variations thereof.

Storage system 303 may comprise any computer readable storage media readable by processing system 301 and capable of storing software 305. Storage system 303 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations storage system 303 may also include communication media over which software 305 may be communicated internally or externally. Storage system 303 may be implemented as a single storage device but may also be implemented across multiple storage devices or sub-systems co-located or distributed relative to each other. Storage system 303 may comprise additional elements, such as a controller, capable of communicating with processing system 301 or possibly other systems.

Software 305 may be implemented in program instructions and among other functions may, when executed by processing system 301, direct processing system 301 to operate as described herein for scheduling process 200. In particular, the program instructions may include various components or modules that cooperate or otherwise interact to carry out scheduling process 200. The various components or modules may be embodied in compiled or interpreted instructions or in some other variation or combination of instructions. The various components or modules may be executed in a synchronous or asynchronous manner, in serial or in parallel, in a single threaded environment or multi-threaded, or in accordance with any other suitable execution paradigm, variation, or combination thereof. Software 305 may include additional processes, programs, or components, such as operating system software or other application software. Software 305 may also comprise firmware or some other form of machine-readable processing instructions executable by processing system 301.

In general, software 305 may, when loaded into processing system 301 and executed, transform a suitable apparatus, system, or device employing computing architecture 300 overall from a general-purpose computing system into a special-purpose computing system customized to facilitate enhanced task scheduling as described herein for each implementation. Indeed, encoding software 305 on storage system 303 may transform the physical structure of storage system 303. The specific transformation of the physical structure may depend on various factors in different implementations of this description. Examples of such factors may include, but are not limited to the technology used to implement the storage media of storage system 303 and whether the computer-storage media are characterized as primary or secondary storage, as well as other factors.

For example, if the computer-storage media are implemented as semiconductor-based memory, software 305 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing architecture 300 is generally intended to represent an architecture on which software 305 may be deployed and executed in order to implement scheduling process 200 (or variations thereof) and optionally all or portions of an information management application. However, computing architecture 300 may also be suitable for any computing system on which software 305 may be staged and from where software 305 may be distributed, transported, downloaded, or otherwise provided to yet another computing system for deployment and execution, or yet additional distribution.

Communication interface system 307 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface system 309 may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 309. In some cases, the input and output devices may be combined in a single device, such as a display capable of displaying images and receiving touch gestures. The aforementioned user input and output devices are well known in the art and need not be discussed at length here. User interface system 309 may also include associated user interface software executable by processing system 301 in support of the various user input and output devices discussed above. Separately or in conjunction with each other and other hardware and software elements, the user interface software and devices may support a graphical user interface, a natural user interface, or the like.

Figure 4:
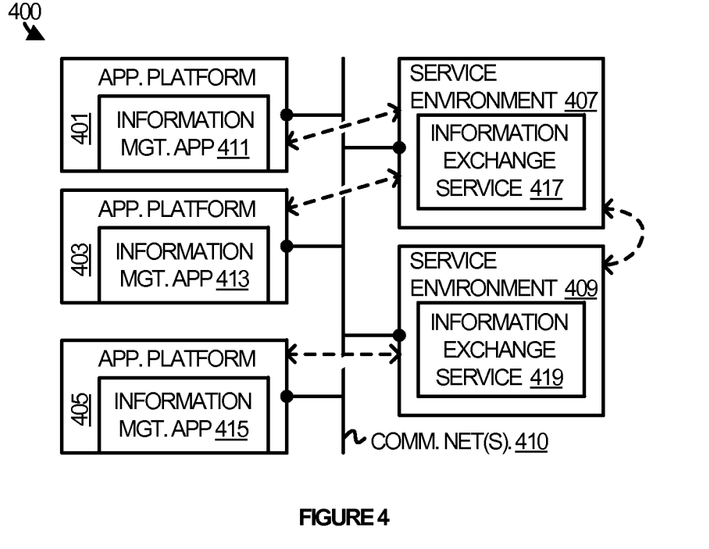
FIG. 4 illustrates a communication environment in an implementation.

FIG. 4 illustrates a communication environment 400 in which various information management applications may implement scheduling process 200. Communication environment 400 includes application platform 401, application platform 403, and application platform 405. Application platform 401 and application platform 403 may communicate with service environment 407 to access information exchange service 417 on behalf of information management application 411 and information management application 413 respectively. Application platform 405 may communicate with service environment 409 to access information exchange service 419 on behalf of information management application 415. From time to time, service environment 407 and service environment 409 may communicate in furtherance of interaction between information exchange service 417 and information exchange service 419.

Examples of application platforms 401, 403, and 405, include, but are not limited to, desktop computers, work stations, laptop computers, notebook computers, tablet computers, mobile phones, personal digital assistances, media devices, gaming devices, and any other physical or virtual computing machine or combinations and variations thereof capable of implementing at least one of a variety of information management applications. Service environment 407 may be any computing system or collection of computing systems capable of implementing an information exchange service 417.

Application platforms 401, 403, and 405 may each be any computing apparatus, system, device, or collections thereof that employ a computing architecture suitable for implementing information management application 411, 413, or 415 respectively. Computing architecture 300 referred to with respect to FIG. 3 is one such representative architecture. Information management applications 411, 413, and 415 may each be any version or variety of an information management application. Examples include but are not limited to locally installed and executed applications, streaming applications, web-based applications that execute at least in part within the context of a browser application, mobile applications, mobile web-based applications that execute at least in part within the context of a mobile browser application, or any other application type, variation, or combination thereof.

Information management applications 411, 413, and 415 may each be embodied in program instructions that, when executed by application platforms 401, 403, and 415 respectively direct each to operate as described herein for scheduling process 200 discussed with respect to FIG. 2. The program instructions may take the form of compiled object code, interpreted scripts, or any other suitable form of program instructions that may be executed directly or indirectly by an application platform, as well as any suitable variation or combination thereof. Examples of information management applications include but are not limited to Microsoft® Outlook®, Mozilla Thunderbird/Lightening, Open Xchange, Microsoft® Outlook® Web App, Microsoft® Outlook® Web App for mobile device, Outlook.com®, Gmail, and Microsoft® Outlook® for mobile devices, as well as another suitable information management application, variation, or combination thereof.

Service environment 407 and service environment 409 may each include any computing apparatus, system, device, or collections thereof that employ a computing architecture suitable for implementing information exchange service 417 and information exchange service 419 respectively. Computing architecture 300 referred to with respect to FIG. 3 is one such representative architecture. Examples include server computers, cloud computing platforms, data centers, and any physical or virtual computing machine, as well as any variation or combination thereof. Examples of information exchange service 417 and information exchange service 419 include but are not limited to Microsoft® Exchange®, Microsoft® O365®, Hotmail®, Outlook.com®, and Gmail, as well as any other information exchange service, combination, or variation thereof capable of operating as described herein.

In operation, any of applications platforms 401, 403, and 405 may communicate from time to time with service environment 407 or service environment 409 over communication network 410 to facilitate the exchange of information between information management applications 411 and 413 and information exchange service 417 and between information management application 415 and information exchange service 419. Service environment 407 and service environment 409 may also communicate over communication network 410 to facilitate the exchange of information.

Communication between any of the elements contemplated in FIG. 4 may occur in accordance with various communication protocols, such as the Internet protocol (IP, IPv4, IPv6, etc.), the transfer control protocol (TCP), and the user datagram protocol (UDP), as well as any other suitable communication protocol, variation, or combination thereof. Communication network 410 may be representative of a network or collection of networks over which the element contemplated in FIG. 4 may exchange information, such as an intranet, the Internet, a local area network, a wide area network, a wireless network, a wired network, or any combination or variation thereof. Communication network 410 may include connections, devices, and communication media, such as metal, glass, air, or any other suitable communication media over which information may be exchanged. The aforementioned communication media, network, connections, protocols, and devices are well known and need not be discussed at length here.

The manner and format in which information is exchanged may vary. In some implementations, an application may exchange information with a service environment and information exchange service in accordance with various protocols, such as IMAP (internet message access protocol), POP (post office protocol), SMTP (simple mail transfer protocol), OWA (Outlook Web App) webmail protocol, various other webmail protocols, various proprietary protocols, HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

FIGS. 5-8 illustrate various operational scenarios that demonstrate various implementations of scheduling process 200. The various scenarios illustrated in FIGS. 5-8 may occur within the context of a suitable application platform (application platforms 401, 403, and 405) executing a suitable information management application (information management applications 411, 413, and 415) in which scheduling process 200 may be embodied. Each scenario therefore illustrates one implementation of scheduling process 200, although it may be appreciated that many other implementations are possible.

The information management application may include a collection of modules, the execution of which instantiates, renders, or otherwise make available the various features and functionality of the application. While a wide variety of modules may be present, for illustrative purposes a scheduler module and task modules are considered herein. Each of the task modules can be executed on a single thread and, upon completing its execution, returns control to the scheduler module. The scheduler module is also executed on the single thread upon control returning from any of the task modules. The scheduler module identifies to which of the various task modules to grant control based at least in part on a relevance of each of the task modules to a user interaction.

When launched or otherwise triggered in operation, the information management application loads an initial subset of the task modules for execution on the single thread while a remaining subset of the task modules load in the background. As mentioned, task modules each return control upon completion to the scheduler module for execution on the single thread. An example of loading the initial subset of the task modules includes loading the modules from a browser cache into an execution environment provided by the browser for execution on the single thread. Another example includes downloading the modules to the application platform from a remote service environment (such as service environment 407 or service environment 409). Other types of loading are possible and may be considered within the scope of the present disclosure.

In some implementations, the initial subset of the task modules that is initially loaded relates to at least one operation series comprised of various tasks that when executed accomplish at least one particular operation. In an example, presenting a view of an inbox may be considered an operation, and the associated tasks needed to present the inbox an operation series. In another example, retrieving and presenting an email may be considered an operation, and the associated tasks needed to present the email an operation series. Other operations and other operation series are possible and may be considered within the scope of the present disclosure.

In some implementations, the initial subset of the task modules are executed to render an initial view of a user interface to the information management application. The user interface may include various elements with which a user may interact, such as menus, panels, graphical objects, or any other user interface element. The initial view could be of, for example, an introduction screen, an inbox, or any other view.

The loading of the initial subset of the task modules may take an appreciable amount of time such that, without implementing scheduling process 200, a user's experience may be sub-optimal. For example, an inbox may be presented upon launching an information management application. As the remainder of the application continues to load, a user may select an email to view. However, a view of the email may be delayed while at least some of the remaining components of the application are loaded, even if those components are unrelated to viewing the email. Scheduling process 200 enhances the user experience by, rather than waiting for the remaining components to load, responds to a user interaction by granting control to a task module relevant to the user interaction. In this example, control would be given to a task or set of tasks associated with viewing the email.

Figure 5:
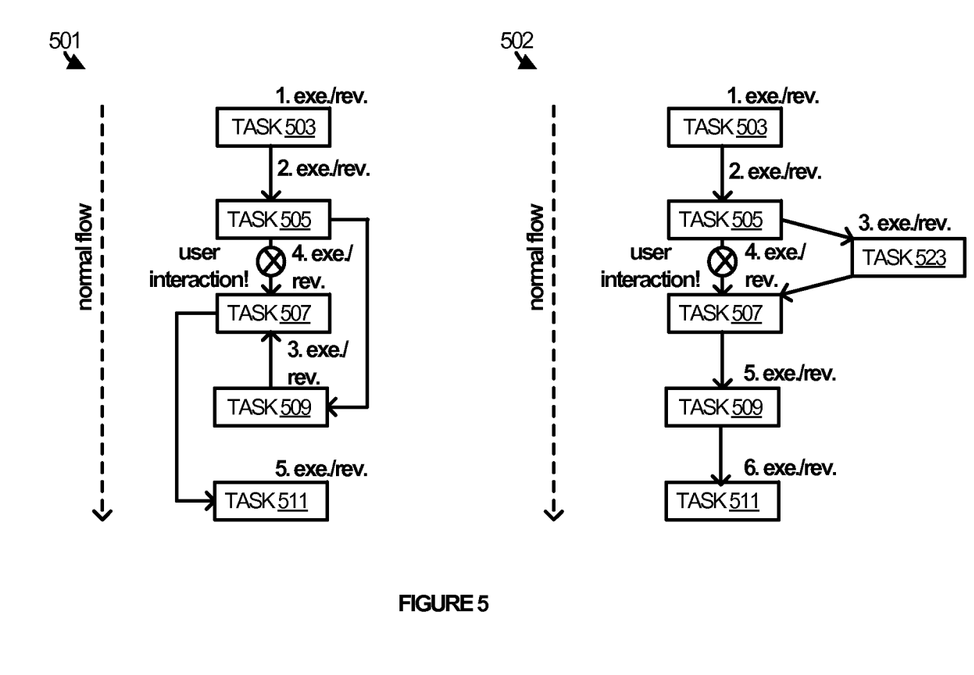
FIG. 5 illustrates various operational scenarios associated with a scheduling process in various implementations.

Referring now to FIG. 5, scenario 501 and scenario 502 are illustrated to demonstrate two ways in which scheduling process 200 may be implemented. In scenario 501, an operation series includes five tasks modules: task 503, task 505, task 507, task 509, and task 511. In normal operation, the normal flow of the operation series would flow sequentially from task 503 to task 511. As each task module is executed on a single thread, the task performs its programmatic functionality and then returns control to a scheduler module (not shown). The scheduler module monitors for user interaction, such as a mouse click, typing, touch, gesture, or any other user input. Responsive to the user input, the scheduler (upon control returning to it) determines which task module to grant control to next. If no user interaction occurs, then the scheduler module grants control to the next task module as defined by the normal flow of the operation series described above.

In scenario 501, the normal flow begins with task 503 executing, followed by task 505. As mentioned, control returns to the scheduler module upon completion of each task. For exemplary purposes, it is assumed that a user interaction occurs during or after the execution of task 505 such that, upon control being granted back to the scheduler module, a decision is made by the scheduler module to grant control to a task module other than the next one as defined by the normal flow.

In this example scenario, control is passed to task 509. Task 509 executes and passes control back to the scheduler module, and in turn to task 507. Task 507 executes and passes control back to the scheduler module. With no other user interactions having occurred, the scheduler module grants control to task 511, which executes returns control to the scheduler module.

Referring to scenario 502, a slightly different execution path is illustrated to highlight another implementation of scheduling process 200. In scenario 502, the operation series again includes five tasks modules: task 503, task 505, task 507, task 509, and task 511. In normal operation, the normal flow of the operation series would flow sequentially from task 503 to task 511. As each task module is executed on a single thread, the task performs its programmatic functionality and then returns control to a scheduler module (not shown). The scheduler module monitors for user interaction, such as a mouse click, typing, touch, gesture, or any other user input. Responsive to the user input, the scheduler (upon control returning to it) determines which task module to grant control to next. If no user interaction occurs, then the scheduler module grants control to the next task module as defined by the normal flow of the operation series described above.

In scenario 502, the task module to which the scheduler module grants control (responsive to a user interaction) is a task module not included in the operation series. In scenario 502, the normal flow begins with task 503 executing, followed by task 505. As mentioned, control returns to the scheduler module upon completion of each task. For exemplary purposes, it is assumed that a user interaction occurs during or after the execution of task 505 such that, upon control being granted back to the scheduler module, a decision is made by the scheduler module to grant control to a task module other than the next one as defined by the normal flow.

In this example scenario, control is passed to task 523, which is not included in the operation series. Task 523 executes and passes control back to the scheduler module. The remainder of the execution of the operation series occurs without any user interaction. Thus, task 507 executes, followed by task 509, and then task 511, with each task returning control to the scheduler module upon completing.

It may be appreciated from scenario 501 and scenario 502 that that a user interaction may cause the scheduler module to grant control to either a task module within an operation series or a task module not included in an operation series. Per scenario 501, control is granted to a task module out-of-sequence with respect to the normal flow of the operation series. Per scenario 502, control is granted to a task module that is not included in the operation series.

Figure 6:
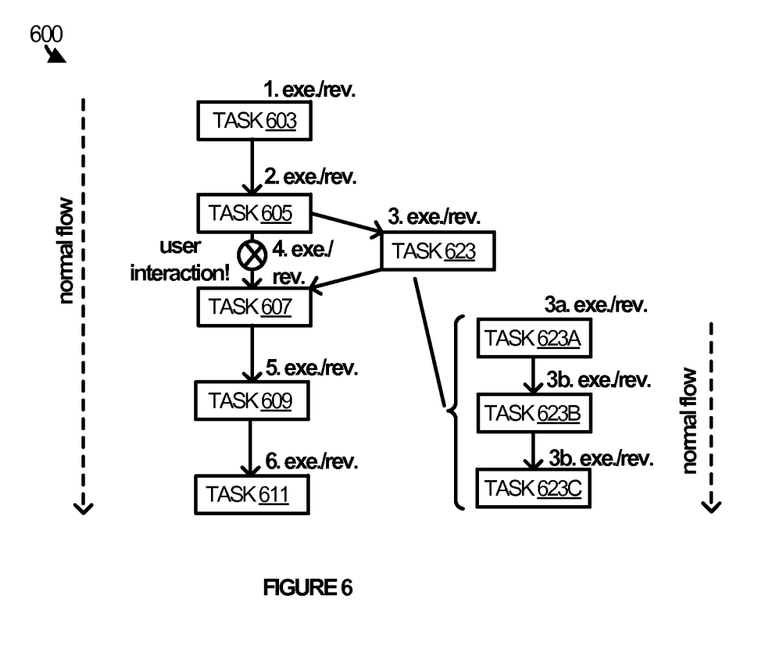
FIG. 6 illustrates an operational scenario associated with a scheduling process in an implementation.

FIG. 6 illustrates another scenario 600 that demonstrates that control may be granted by the scheduler module to a task module or another operation series that includes multiple task modules that execute before control returns to the original operation series.

Referring to scenario 600, the operation series includes five tasks modules: task 603, task 605, task 607, task 609, and task 611. In normal operation, the normal flow of the operation series would flow sequentially from task 603 to task 611. As each task module is executed on a single thread, the task performs its programmatic functionality and then returns control to a scheduler module. The scheduler module monitors for user interaction, such as a mouse click, typing, touch, gesture, or any other user input. Responsive to the user input, the scheduler determines which task module to grant control to next. If no user interaction occurs, then the scheduler module grants control to the next task module as defined by the normal flow of the operation series described above.

In scenario 600, the task module to which the scheduler module grants control (responsive to a user interaction) is a task module not included in the operation series. In scenario 600, the normal flow begins with task 603 executing, followed by task 605. As mentioned, control returns to the scheduler module upon completion of each task. For exemplary purposes, it is assumed that a user interaction occurs during or after the execution of task 605 such that, upon control being granted back to the scheduler module, a decision is made by the scheduler module to grant control to a task module other than the next one as defined by the normal flow.

In this example scenario, control is passed to task 623, which is not included in the operation series. Task 623 includes various sub-modules: task 623A, task 623B, and task 623C. Each of the sub-modules execute on a single thread and, upon completion, return control the scheduler module to determine which task module to give control to next. In this example scenario, task 623A is executed, followed by task 623B, and then task 623C, each of which returns control to the scheduler module upon completing.

Once the sub-modules have executed, control flows back via the scheduler module to task 607. The remainder of the execution of the operation series occurs without any user interaction. Thus, task 607 executes, followed by task 609, and then task 611, with each task returning control to the scheduler module upon completing.

Figure 7:
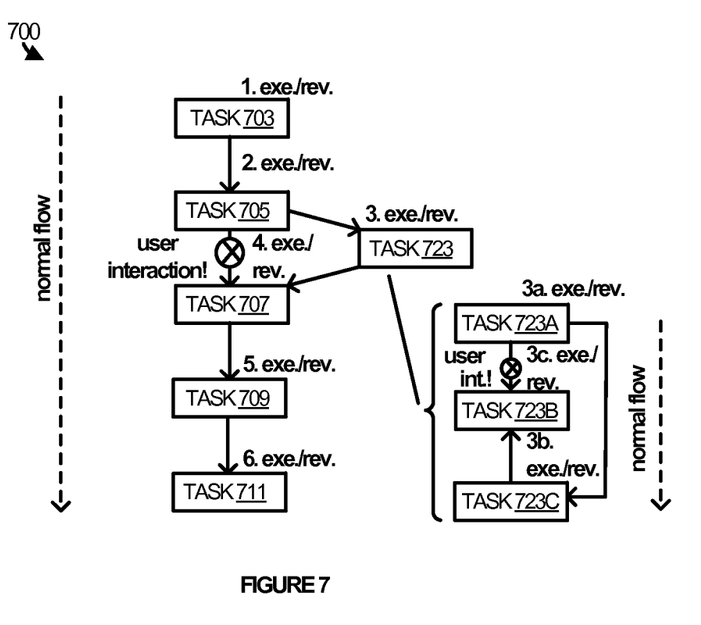
FIG. 7 illustrates an operational scenario associated with a scheduling process in an implementation.

FIG. 7 illustrates a scenario 700 that, like scenario 600, demonstrates that control may be granted by the scheduler module to task module or another operation series that includes multiple task modules that execute before control returns to the original operation series. However, scenario 700 also demonstrates that control may be granted to a task module out-of-sequence with respect to the normal flow of various sub-modules outside of or not included in the operation series.

Referring to scenario 700, the operation series includes five tasks modules: task 703, task 705, task 707, task 709, and task 711. In normal operation, the normal flow of the operation series would flow sequentially from task 703 to task 711. As each task module is executed on a single thread, the task performs its programmatic functionality and then returns control to a scheduler module. The scheduler module monitors for user interaction, such as a mouse click, typing, touch, gesture, or any other user input. Responsive to the user input, the scheduler determines which task module to grant control to next. If no user interaction occurs, then the scheduler module grants control to the next task module as defined by the normal flow of the operation series described above.

In scenario 700, the task module to which the scheduler module grants control (responsive to a user interaction) is a task module not included in the operation series. In scenario 700, the normal flow begins with task 703 executing, followed by task 705. As mentioned, control returns to the scheduler module upon completion of each task. For exemplary purposes, it is assumed that a user interaction occurs during or after the execution of task 705 such that, upon control being granted back to the scheduler module, a decision is made by the scheduler module to grant control to a task module other than the next one as defined by the normal flow.

In this example scenario, control is passed to task 723, which is not included in the operation series. Task 723 includes various sub-modules: task 723A, task 723B, and task 723C. Each of the sub-modules execute on a single thread and, upon completion, return control the scheduler module to determine which task module to give control to next. In this example scenario, task 723A executes, after which a user interaction occurs. The scheduler module responsively grants control to task 723C, rather than task 723B. Task 723C executes and returns control to the scheduler module which, in turn, grants control to task 723B so that it can execute.

Upon the sub-modules completing their execution, control flows back via the scheduler module to task 707. The remainder of the execution of the operation series occurs without any user interaction. Thus, task 707 executes, followed by task 709, and then task 711, with each task returning control to the scheduler module upon completing its execution.

Figure 8:
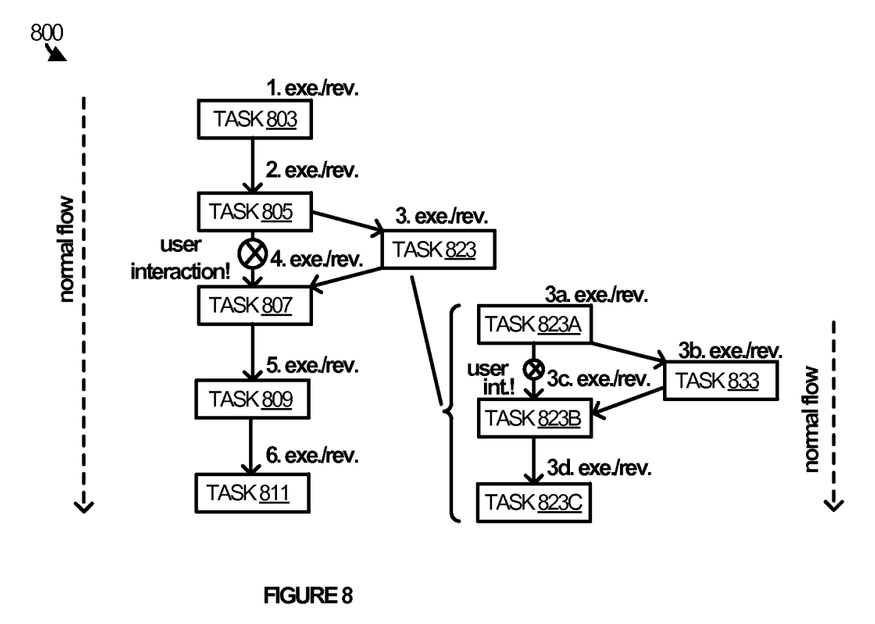
FIG. 8 illustrates an operational scenario associated with a scheduling process in an implementation.

FIG. 8 illustrates a scenario 800 that, like scenario 700, demonstrates that control may be granted by the scheduler module to a task module or another operation series that includes multiple task modules that execute before control returns to the original operation series. However, scenario 800 also demonstrates that control may be granted to a task module not included in the group of sub-modules. In other words, control may be granted in an expanding fashion several degrees removed from the initial operation series.

Referring to scenario 800, the operation series includes five tasks modules: task 803, task 805, task 807, task 809, and task 811. In normal operation, the normal flow of the operation series would flow sequentially from task 803 to task 811. As each task module is executed on a single thread, the task performs its programmatic functionality and then returns control to a scheduler module. The scheduler module monitors for user interaction, such as a mouse click, typing, touch, gesture, or any other user input. Responsive to the user input, the scheduler determines which task module to grant control to next. If no user interaction occurs, then the scheduler module grants control to the next task module as defined by the normal flow of the operation series described above.

In scenario 800, the task module to which the scheduler module grants control (responsive to a user interaction) is a task module not included in the operation series. In scenario 800, the normal flow begins with task 803 executing, followed by task 805. Control returns to the scheduler module upon completion of each task. For exemplary purposes, it is assumed that a user interaction occurs during or after the execution of task 805 such that, upon control being granted back to the scheduler module, a decision is made by the scheduler module to grant control to a task module other than the next one per the normal flow.

In this example scenario, control is passed to task 823, which is not included in the operation series. Task 823 includes various sub-modules: task 823A, task 823B, and task 823C. Each of the sub-modules execute on a single thread and, upon completion, return control the scheduler module to determine which task module to give control to next. In this example scenario, task 823A executes, after which a user interaction occurs. The scheduler module responsively grants control to task 833, which is outside of or otherwise not included in the operation series associated with task 823.

Task 833 executes and returns control to the scheduler module. The scheduler module then calls task 823B, which executes, and then task 823C, which executes. Upon the sub-modules completing their execution, control returns via the scheduler module to task 807. The remainder of the execution of the operation series occurs without any user interaction. Thus, task 807 executes, followed by task 809, and then task 811, with each task returning control to the scheduler module upon completing its execution.

Figure 9:
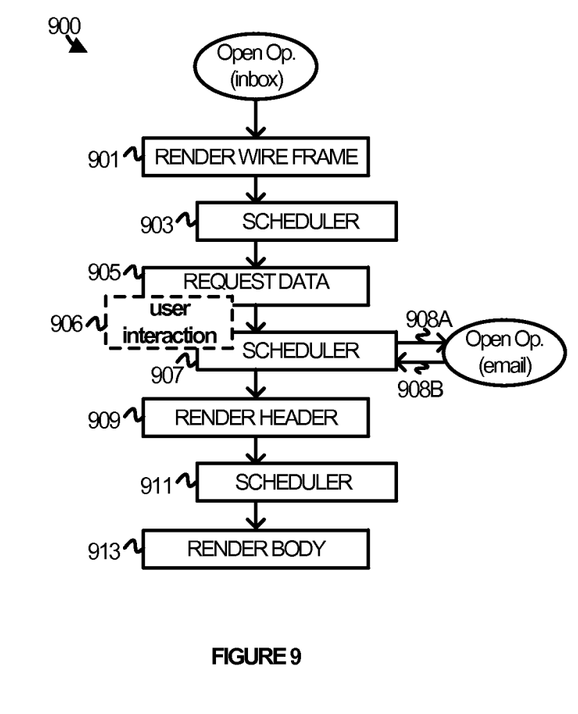
FIG. 9 illustrates an operational scenario associated with a scheduling process in an implementation.

FIG. 9 illustrates an operational scenario 900 in an implementation involving two open operations that may occur within the context of an information management application executing on an application platform. In operational scenario 900, an open operation is invoked to open a view of an inbox. The open operation includes various tasks, including: rendering a wire frame, requesting data, rendering a header, and rendering a body. Thus, the view of the inbox includes at least a wire frame defining all or portions of the inbox, data with which to populate various elements in the inbox, a header with which to provide contextual information in the inbox, and a body in which to possibly present some or all of the contents of an email or emails in the inbox.

In operation, each task is executed and upon its completion, control is granted to a scheduler. The scheduler determines which task to execute next in view of various programming rules or constraints, such as the order of operation in which the tasks are programmed. However, the scheduler module also considers whether or not a user interaction has occurred, in response to which some other task or operation can be invoked. Operational scenario 900 illustrates just one such example whereby an open operation performed with respect to an inbox is interrupted by a user interaction in favor of an open operation initiated with respect to one of the emails in the inbox. The following discussion makes parenthetical reference to the steps illustrated in FIG. 9 for purposes of clarity, although it may be appreciated that additional steps in addition to or in place of those shown are possible.

To begin, an initial open operation is started, possibly in response to launching or otherwise triggering all or portions of an information management application. A wire frame is rendered by the application (step 901) and control is granted to a scheduler (step 903). The scheduler determines which task to grant control to next, which in this example is a request data task. Data is requested (step 905) and, upon completing the request, control is again granted back to the scheduler.

Either during or after the data request, a user interaction occurs (step 906), such as a mouse click, touch, gesture, or some other user input indicative of a command to open an email that is at least partially presented within the context of the open inbox. In response to the user interaction, the scheduler determines which task to pass control to next (step 907). In this example, control is passed to an open operation associated with the email (step 908A).

The open operation functioning with respect to the email may include a task or various sub-tasks that can be carried out to open and present the email. Examples may include a render wire frame task, a request data task, a render header task, and a render body task, as well as any other task in addition to or in place of those discussed herein.

When executing the various tasks in the open operation, control returns to the scheduler upon completion of any individual task. In this manner, the scheduler may give control to some other operation in the event that a relevant user interaction occurs. However, it is assumed for exemplary purposes that the tasks associated with opening the email complete without any user interaction and control is given back to the scheduler (step 908B).

The scheduler can then continue with executing the tasks associated with opening the inbox. For example, the header can be rendered (step 909). Upon rendering the header, control returns again to the scheduler (step 911), which passes control to the body rendering tasks in order to render the body of the inbox (step 913).

In this manner, loading and rendering the various elements associated with a view of an inbox can be interrupted in order to provide a user with a view of a particular email selected for viewing. The various tasks needed to render the view of the email can proceed, rather than waiting for all of the tasks associated with presenting the inbox to complete. Once the view of the email is completed, tasks associated with presenting the inbox can be continued. It may be appreciated that the remaining tasks may execute in the background while the view of the email is maintained on a display screen. However, it may also be the case that the user navigates away from the view of the email and returns to the view of the inbox, in which case the inbox view would be displayed.

While the various implementations described above generally refer to information management applications, it may be appreciated that scheduling process 200 and variations thereof may also be implemented in other types of applications. For example, scheduling process 200 may be implemented with respect to productivity applications, enterprise applications, gaming applications, and communication applications, as well as any other type of program application.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A computing apparatus comprising:
one or more computer readable storage media; and
an application comprising interpreted program instructions stored on the one or more computer readable storage media and executable on a single thread, the interpreted program instructions comprising:
a plurality of task modules for loading an email folder in a user interface to the application, each of which when executed on the single thread by a processing system, directs the processing system to return control to a scheduler module upon completing; and
the scheduler module, wherein the scheduler module, when executed on the single thread by the processing system upon control returning from any of the plurality of task modules directs the processing system to at least:
determine whether user interaction has occurred in a user interface to the application since last having granted control to any of the plurality of task modules;
if the user interaction occurred and pertained to one or more emails in the email folder being loaded, then grant control to a task module out of order with respect to a programmed order of the plurality of task modules; and if the user interaction did not occur, then grant control to a next task module in the programmed order of the plurality of task modules.

2. The computing apparatus of claim 1 wherein the scheduler module further directs the processing system to, if the user interaction occurred and did not pertain to the one or more emails in the email folder being loaded, then grant control to the next task module in the programmed order of the plurality of task modules.

3. The computing apparatus of claim 2 wherein the task module returns control to the scheduler module upon completing.

4. The computing apparatus of claim 3 wherein the plurality of task modules execute on the single thread upon launching the application and render an initial view of the user interface to the application that includes the email folder.

5. The computing apparatus of claim 4 wherein the task module renders a view of at least an email to which the user interaction pertained.

6. The computing apparatus of claim 5 wherein the plurality of task modules and the scheduler module comprise java script.

7. The computing apparatus of claim 1 further comprising the processing system configured to execute the plurality of task modules and the scheduler module on the single thread.

8. A method for facilitating an information exchange service comprising:
launching an application that interfaces with the information exchange service, the application comprising a plurality of task modules and a scheduler module, wherein the plurality of task modules each return control to the scheduler module upon completion;
upon completing execution of any of the plurality of task modules on a single thread, returning control to the scheduler module; and
upon control returning to the scheduler module:
determining whether user interaction has occurred in a user interface to the application since last having granted control to any of the plurality of task modules;
if the user interaction occurred and pertained to one or more emails in an email folder being loaded in the user interface, then granting control to a task module out of order with respect to a programmed order of the plurality of task modules; and
if the user interaction did not occur, then granting control to a next task module in the programmed order of the plurality of task modules.

9. The method of claim 8 further comprising the scheduler module, if the user interaction occurred and did not pertain to the one or more emails in the email folder being loaded, granting control to the next task module in the programmed order of the plurality of task modules.

10. The method of claim 9 wherein the task module return control to the scheduler module upon completing.

11. The method of claim 10 wherein the plurality of task modules execute on the single thread upon launching the application and render an initial view of the user interface to the application that includes the email folder.

12. The method of claim 11 wherein the task module renders a view of at least an email to which the user interaction pertained.

13. The method of claim 12 wherein the user interaction interrupts loading of the email folder in the user interface.

14. The method of claim 13 wherein the plurality of task modules and the scheduler module comprise JavaScript.

15. One or more computer readable storage media having program instructions stored thereon for facilitating an information management application that, when executed by a processing system, direct the processing system to at least:
load an initial subset of a plurality of task modules for execution on a single thread while a remaining subset of the plurality of task modules load in the background, wherein each of the plurality of task modules returns control upon completion to a scheduler module for execution on the single thread; and
upon control returning to the scheduler module, execute the scheduler module to identify to which of the plurality of task modules to grant control next based at least in part on whether user interaction has occurred in a user interface to the application since last having granted control to any of the plurality of task modules; and
if the user interaction occurred, and pertained to one or more emails in an email folder being loaded in the user interface, then grant control to a task module out of order with respect to a programmed order of the plurality of task modules; and
if the user interaction did not occur, then grant control to a next task module in the programmed order of the plurality of task modules.

16. The one or more computer readable storage media of claim 15 wherein the initial subset of the plurality of task modules comprises an operation series interrupted by the user interaction and wherein the scheduler module grants control to a one of the plurality of task modules included in the remaining subset of the plurality of task modules.

17. The one or more computer readable storage media of claim 15 wherein the program instructions direct the processing system to load the initial subset of the plurality of task modules in response to launching the information management application, wherein the initial subset of the plurality of task modules, when executed by the processing system, render an initial view of the user interface to the information management application, the user interface comprising a plurality of elements.

18. The one or more computer readable storage media of claim 17 wherein the plurality of task modules and the scheduler module comprise JavaScript.

19. The one or more computer readable storage media of claim 18 wherein the user interaction interrupts loading of a plurality of emails in the user interface.

20. The one or more computer readable storage media of claim 15 wherein, if the user interaction occurred and did not pertain to the one or more emails in the email folder being loaded, then the program instructions further direct the processing to execute the scheduler module to grant control to the next task module in the programmed order of the plurality of task modules.

* * * * *